Patented Apr. 29, 1952

2,594,822

UNITED STATES PATENT OFFICE 2,594,822

PREPARATION OF GREASES

Fred H. Stross, Stanley T. Abrams, and Robert J. Moore, Berkeley, Calif., assignors to Shell Development Company, San Francisco, Calif., a corporation of Delaware No Drawing. Application April 16, 1949, Serial No. 88,042

14 Claims. (Cl. 252—25)

This invention pertains to the art of producing greases or thickening liquids and, more particularly, it relates to a grease containing inorganic gels as the thickening agent.

Oils have been thickened or gelled by the presence of inorganic materials and specifically by the presence of unshrunken gels of inorganic oxides and hydroxides, such as the aerogels of silica, magnesia, alumina and the like. Heretofore, it has been essential to prepare the inorganic gel apart from the medium in which it is finally employed. This has been necessary since it was found that only those gels having substantially their original structure were capable of forming grease-like compositions with lubricants. The principal means and agents for forming these greases of inorganic gels have been described in a patent to S. S. Kistler, U. S. 2,260,625. This and other patents to the same inventor describe the process of aerogel formation. Preferably this comprises forming a hydrogel, replacing the water with a water-miscible organic solvent such as alcohol, heating the resulting alcogel in an autoclave to a temperature above the critical temperature of alcohol and subsequently removing the solvent. This forms an aerogel which, according to the accepted definition, comprises a gel having substantially the structure originally formed as opposed to xerogels, which are prepared by drying hydrogels under conditions where the gel structure shrinks during the drying process.

Another means known to the prior art for the formation of greases of inorganic gels comprises formation of a hydrogel, replacement of water with a water-miscible organic solvent, replacement of the water-miscible organic solvent with an oil-soluble solvent and transference of the resulting organogel to a lubricating oil medium followed by the removal of an oil-soluble solvent to form, finally, an oleogel.

It will be readily apparent that both of these formations of oleogels and aerogels entail a number of undesirable features from the standpoint of material handling. The process of aerogel formation necessitates the use of expensive equipment and both the preparation and incorporation of either aerogels or oleogels in lubricating media require extensive labor.

It is an object of the present invention to provide an improved process for the preparation of greases gelled by the presence of inorganic gels. It is another object of the present invention to provide a process for the preparation of greases having improved resistance to attack by water. It is a further object of the present invention to provide a process for the preparation of greases gelled with calcium hydroxide, said greases being substantially water-resistant. Other objects will become apparent during the following description.

Now, in accordance with this invention, a new method for the formation of an oleogel suitable for use as a lubricating grease has been found comprising dissolving a polyvalent metal alcoholate in a lubricating oil, hydrolyzing the alcoholate to form a metal hydroxide, and removing non-metallic volatile products of the hydrolysis. This process results in the formation of a lubricating grease having the lubricating oil as the continuous phase gelled by the polyvalent metal hydroxide dispersed therein.

While the present process will be described with particular reference to greases comprising calcium hydroxide or aluminum hydroxide, it will be understood that other gels of inorganic hydroxides and hydrous oxides may be used as well, either in addition to or in place of those described in detail. Principal among the desirable hydroxides for the present purpose, are those of silicon, aluminum, calcium, barium, titanium, chromium, iron, vanadium, magnesium, copper, cobalt, nickel, tin, lead and selenium.

According to the process of the present invention, alcoholates of polyvalent metals such as those above are dissolved or at least uniformly dispersed in a lubricating oil medium. The term "alcoholates" is meant to include such materials as calcium ethylate, aluminum isopropylate, magnesium methylate, and similar alcoholates as well as the so-called "silicon esters" which are fully described in the text by E. G. Rochow, "Chemistry of the Silicones," John Wiley and Sons, 1946. The silicon esters may be regarded as esters of orthosilicic acid $Si(OH)_4$. The silicon esters include such materials as tetraethyl silicate or mixed esters such as dimethyl diethyl silicate. They are also known as tetra-alkoxy silanes. However, for the present purpose they are included in the generic term together with the alcoholates of the remaining metals as being alcoholates of silicon.

A special group of alcoholates which will be referred to hereinafter comprises the alcoholates of alkaline earth metals such as calcium. It has been found that the hydroxides formed from calcium alcoholates, according to the present process, form lubricating greases which have outstanding resistance to deleterious water action as compared with greases of other inorganic gels. The reason for water resistance of calcium hydroxide greases formed by the present process has not been determined. It is noteworthy, however, that these greases of calcium hydroxide formed from calcium alcoholates differ from the other greases such as those formed from aluminum alcoholates and the like in this peculiar inherent water-proofing property. Since calcium hydroxide greases formed by processes other than that described and claimed herein are not inherently water-proof, it is possible to state that calcium hydroxide greases in general are no different in this property than are greases prepared from gels such as silica gel. However, in view of the special water-proof characteristics of the calcium grease prepared as described herein, the greases so prepared constitute one phase of the present invention.

It is a preferred practice to use alcoholates of the lower alcohols since these are more easily prepared than those of the higher alcohols. Hence, alcoholates wherein each alcohol radical contains from 1 to 6 carbon atoms are preferred. However, according to one feature of the present invention, alcoholates containing a fraction of the alcohol radicals derived from higher alcohols are suitable for the formation of water-resistant greases, as described more fully hereinafter.

Greases comprising inorganic hydroxide gels are especialy useful for high temperature purposes. Their use, in fact, appears to be limited principally by the thermal stability or volatility of the lubricating oil medium since the inorganic hydroxide gel is substantially indifferent to thermal influences. The lubricating oil in which the alcoholates may be dispersed includes especially mineral lubricating oils of petroleum origin. These may be substituted wholly or in part by vegetable or animal oils as well as by synthetic oils such as those obtained by alkylating aromatic hydrocarbons, as is well understood by those skilled in the art. Synthetic lubricants include alkylated naphthalenes, preferably containing branched alkyl groups having 3 to 8 carbon atoms each; esters of dicarboxylic acids having at least 6 carbon atoms such as bis (2-ethylhexyl sebacate; polyalkylene oxides and glycols within the lubricating oil viscosity range such as polypropylene glycol; organic phosphates such as tricresyl phosphate, trioctyl phosphate, tributyl phosphate and mixed phosphates such as phenyldibutyl phosphate. Other synthetic lubricants useful in the present process include condensation products of unsaturated ethers with hydrogen sulfide or mercaptans, such as the adduct of hydrogen sulfide and diallyl ether. Polymerized wax olefins have been found to be outstanding in their thermal stability.

The process according to the present invention comprises dissolving or dispersing one or more of the above polyvalent metal alcoholates in the lubricating oil medium and subsequently subjecting the solution or dispersion to hydrolysis influences. Preferably, the alcoholate dissolved in a lubricating oil is treated with small increments of water at temperatures between about 20 and 95° C. Higher or lower temperatures may be employed depending upon the ease of hydrolysis of the alcoholate and the rate of hydrolysis desired. The water used for hydrolyzing action may be added in the form of water saturated air or may be added in the pure state or diluted by a miscible solvent such as acetone. During the hydrolysis, it is a highly preferred practice to agitate and heat the reaction mixture so as to maintain as high a degree of dispersion of the reactants and hydrolysis products as possible.

The preparation of alcoholates does not form a part of the present invention, since the practical methods are well known in the art. A typical preparation comprises degreasing aluminum powder with chloroform, mixing the degreased aluminum with small amounts of catalysts such as mercuric chloride and iodine, gradually adding an alcohol such as secondary butyl alcohol, maintaining the reaction mixture at about room temperature by cooling during hydrogen evolution, and eventually warming the mixture on a steam bath for a period of about 1 to 3 hours. Excess alcohol may be removed in vacuum after which the aluminum secondary butylate may be dissolved in a mineral lubricating oil. The oil solution of the butylate is then treated at about 80° C. with air which has been saturated with water. The saturated air is metered into the mixture until an amount has been added which is sufficient to hydrolyze the alcoholate to form aluminum hydroxide. The mixture is then subjected to vacuum distillation at about the same temperature for the removal of alcohol and any excess water which may be present. It will be understood that the gel which results may sometime comprise a mixture of hydroxides and oxides, but will usually predominate in the polyvalent metal hydroxide.

According to one phase of the present invention, a process has been devised for the preparation of greases comprising inorganic gels which are resistant to the action of water. Greases made from inorganic gels such as alumina or silica are more or less unstable when treated with water in the sense that they tend to separate into two phases for a reason as yet undetermined. The resistance to water action varies to a certain extent with a method by which the grease has been prepared, but in most cases, greases of silica and alumina gels and the like are unstable either in the presence of cold water or when treated with boiling water. It has been noted that the resistance to phase separation upon water treatment may be increased by the incorporation of certain agents such as soaps, amines and hydroxy compounds such as 12-hydroxy stearic acid, glycerol monooleate, 1,10-decamethylene glycol and similar materials. However, it would be desirable to produce a grease which did not require the presence of a water-proofing agent. It has been discovered that greases gelled by the presence of calcium hydroxide are highly resistant to phase separation in the presence of either hot or cold water. Hence, these greases are sharply differentiated from those comprising silica gel or alumina gel. The process for the preparation of calcium hydroxide greases is preferably carried out according to the method described below and the preferred alcoholate is calcium ethylate.

Calcium ethylate may be readily prepared by boiling calcium turnings with anhydrous ethyl alcohol. The calcium ethylate may be dissolved or suspended together with ethanol in a mineral lubricating oil and hydrolyzed by the slow addition of cold water with stirring. The mixture is then heated to 130–140° C. for the removal of alcohol, after which the remaining calcium hydroxide and oil are milled to produce a smooth grease.

Another means of improving the water resistance of inorganic oxide and hydroxide greases comprises dissolving in the lubricating oil an alcoholate of a polyvalent metal wherein a fraction of the alcohol radicals contain 8 or more carbon atoms. Preferably higher fatty alcohol radicals such as the stearyl radical are included. Hydrolysis of this type of alcoholate should be carried only to the point where the lower alcohol radicals are hydrolyzed, leaving a minor proportion of higher fatty alcohol radicals unaffected. The resulting grease then contains a gel which has been found to have hydrophobic properties and which, therefore, resists disintegration by either hot or cold water. If the gel resulting from such a preparation contains from 1 to 3 alcohol radicals of 8 or more carbon atoms for every 10 hydroxy groups present, the grease will be water-resistant.

In preparing aluminum hydroxide greases by the method of the present invention it is a preferred practice to employ aluminum isopropylate since it has been found that the hydrolysis step may be effected with a greater latitude in conditions than when the higher alcoholates such as the aluminum butylates are used. When hydrolyzing the secondary butyl alcoholate of aluminum in the presence of oil, it is necessary to add water by means of saturated air since more rapid addition of water causes the formation of a gelatinous precipitate which can not be readily worked into a grease. On the other hand, when aluminum isopropylate is the agent utilized, water may be added in the pure state in small increments without causing gelatinous precipitation.

The greases prepared as described herein may contain oxidation inhibitors such as phenyl alpha-naphthalamine or substituted phenols or may be modified by the presence of high molecular weight amines, water-insoluble soaps or water-proofing agents such as dimethyl dichlorosilane.

In order to obtain proper consistency in the greases described, formation of 1 to 40% of the inorganic gel, based on the weight of the total grease, is preferred. Greases having from 5 to 15% by weight of the gel ordinarily have consistencies suitable for normal uses.

One phase of the present invention comprises the unexpected finding that polyvalent metal hydroxide gels formed in accordance with the present process have at least twice the grease forming power of ordinary aerogels; that is, for a given grease penetration, only about half as much of the gels described is required as is needed when aerogels are used. Moreover, for a given gel content, substantially stiffer greases are obtained when the process of this invention is employed than when aerogels are used.

The following examples describe the preparation of typical greases by the process of the present invention.

Example I

Calcium turnings were placed in a Soxhlet thimble and subjected to the action of boiling ethyl alcohol in large excess. The ethyl alcohol solution of calcium ethylate which formed was mixed with a low viscosity mineral lubricating oil in a proportion of 158 parts calcium ethylate solution to 20 parts lubricating oil. The mixture was stirred while 5 parts of water were gradually added. The reaction mass was heated to 137° C. with stirring to evaporate alcohol and excess water. The calcium hydroxide formed by this reaction dispersed in the lubricating oil to form a grease containing about 10% calcium hydroxide. It was found that this grease was resistant to the action of cold and boiling water without further modification.

Example II

Aluminum powder was degreased by washing with chloroform. 18 parts of the powder were then mixed with .133 part mercuric iodide and 1.5 parts of iodine. 230 parts dehydrated secondary butyl alcohol were gradually added to the aluminum powder while cooling to control the reaction. After evolution of hydrogen had ceased, the mixture was heated on a steam bath for 1½ hours. An equal weight of the aluminum butylate and of a low viscosity mineral lubricating oil were mixed and warmed to 80° C. While the warm mixture was rapidly stirred, air saturated with water was introduced. This was continued until the hydrolysis of the aluminum butylate was complete after which the mixture was heated and stirred to remove alcohol and excess water. When the latter two volatile constituents had been substantially removed, the aluminum hydroxide formed a grease with the oil which contained approximately 10% of the gelling agent.

Example III

Aluminum isopropylate was produced by initially heating a mixture of aluminum with mercuric iodide and iodine catalyst together with isopropyl alcohol. After the reaction was initiated by heating, it was necessary to cool the mixture to control the rate of hydrogen evolution. 100 parts of aluminum isopropylate were dissolved in isopropyl alcohol and mixed with 130 parts of a light mineral lubricating oil containing 2% by weight of stearic acid. 25 parts of water were added to this mixture at room temperature with continuous stirring. The mixture was then heated at 125° C. with occasional stirring to remove water and alcohol, the remaining components comprising a grease of aluminum hydroxide and the mineral oil. The grease contained approximately 16% aluminum hydroxide. All "parts" in the above examples refer to parts by weight.

A further aspect of the present invention comprises the finding that greases gelled by the presence of hydroxides of metals of the left hand column of group II in the periodic table have properties which not only are advantageous but also unexpected in comparison with other types of inorganic gel greases. The preferred greases of this category, which will be referred to hereinafter as "base reserve greases," include especially calcium, barium and strontium hydroxides in gellable media. The "base reserve" characteristic is believed to account for the outstanding anti-corrosion and anti-oxidation properties of greases made therefrom. The strength of the hydroxides referred to is apparently sufficient to neutralize acids formed by oxidation or oil decomposition and yet not so strong as to cause corrosion of metal surfaces. These base reserve greases are moreover useful as addition agents for other types of compositions such as lubricating oil compositions.

As referred to hereinbefore, greases of this class especially characterized by greases of calcium hydroxide gels show an unexpected response to the presence of water-proofing agents. Ordinary greases containing silica gel, for example, require approximately 5% by weight of the gel of hydrophobic surface-active agents in order to preserve grease structure during contact with water. In contrast to this, it has been discovered that greases of the class now described are effectively protected against deleterious water action by the presence of as little as 0.5% of hydrophobic surface active agents based on the weight of the gelling agent, although as much as about 20% may be used.

The term "hydrophobic surface active agents" is meant to include such materials as hydroxy fatty acids, high molecular weight glycols, high molecular weight monohydric alcohols, hydroxy fatty acid soaps, fatty acid soaps, high molecular weight fatty acids, hydrocarbon sulfonic acids, hydrocarbon phosphinic and phosphonic acids, high molecular weight amines, and alkyl halogen silanes. Preferred species of water-proofing agents include 12-hydroxy stearic acid, aluminum oleate, glycerol mono-oleate, octadecyl amine and dimethyldichlorosilane. These types of agents useful for improving the water resistance of greases comprising inorganic gels are more fully described in co-pending applications to Walter H. Peterson, Fred Stross and Stanley T. Abrams, Serial No. 782,694, filed October 28, 1947 (now Patent No. 2,554,222, dated May 22, 1951); Serial No. 782,695, filed October 28, 1947 (now abandoned); Serial No. 39,805, filed July 20, 1948 (now Patent No. 2,584,085, dated January 29, 1952); Serial No. 82,905, filed January 22, 1949 (now Patent No. 2,573,650, dated October 30, 1951); Serial No. 133,962, filed December 19, 1949, and Serial No. 91,229, filed May 3, 1949.

We claim as our invention:

1. A process for the preparation of a grease comprising dispersing calcium ethylate in a mineral lubricating oil, hydrolyzing said ethylate with water to form calcium hydroxide and removing non-metallic hydrolysis products, the calcium hydroxide and oil forming a grease composition.

2. A process for the preparation of a grease comprising dispersing aluminum isopropylate in lubricating oil, hydrolyzing said isopropylate to form aluminum hydroxide and removing non-metallic hydrolysis products, the hydroxide and oil forming a grease composition.

3. A process for the preparation of a grease comprising dispersing aluminum secondary butylate in mineral lubricating oil, treating said mixture at a temperature of 20 to 95° C. with an inert gas saturated with water to form aluminum hydroxide and removing non-metallic hydrolysis products, the hydroxide and oil forming a grease composition.

4. In a process for the formation of a grease, the steps comprising dispersing a calcium alcoholate in a lubricating oil, hydrolyzing said alcoholate to form a hydroxide, and removing non-metallic hydrolysis products, the hydroxide and oil forming a water-resistant grease.

5. In a process for the formation of a grease, the steps comprising dispersing anl alkaline earth metal alcoholate in a lubricating oil, hydrolyzing said alcoholate with water to form a hydroxide, and removing non-metallic hydrolysis products by distillation, the hydroxide being present in an amount sufficient to impart a grease structure to said oil.

6. In a process for the formation of a grease, the steps comprising dispersing an alcoholate of a polyvalent metal in a lubricating oil, hydrolyzing said alcoholate to form a polyvalent metal hydroxide and removing non-metallic hydrolysis products.

7. A grease composition comprising a mineral lubricating oil gelled by the presence of calcium hydroxide, said calcium hydroxide gel having been formed by the process according to claim 6.

8. In a process for the formation of a grease, the steps comprising dispersing an alcoholate of an alkaline earth metal in lubricating oil, hydrolyzing said alcoholate to form an alkaline earth metal hydroxide and removing non-metallic hydrolysis products to form a grease containing 1–40% by weight, based on the grease, of the hydroxide as the essential gelling agent.

9. In a process for the formation of a grease, the steps comprising dispersing an alcoholate of a metal having a valence of 2 to 3, inclusive, in a lubricating oil, hydrolyzing said alcoholate to form a metallic hydroxide and removing non-metallic hydrolysis products to form a grease containing 5–15% by weight, based on said grease of metallic hydroxide as the essential gelling agent.

10. In a process for the formation of a grease, the steps comprising dispersing an alcoholate of a metal having a valence of 2 to 3 and of an alcohol containing from 1 to 6 carbon atoms per molecule in a lubricating oil, hydrolyzing said alcoholate to form a metallic hydroxide and removing non-metallic hydrolysis products to form a grease containing 5–15% by weight, based on said grease of metallic hydroxide as the essential gelling agent.

11. In a process for the formation of a grease, the steps comprising dispersing a mixture alcoholate of a metal having a valence of 2 to 3, inclusive, with a mixture of alcohols having from 1 to 6 carbon atoms and alcohols having at least 8 carbon atoms in a lubricating oil, hydrolyzing said alcoholates of alcohols having from 1 to 6 carbon atoms to form a mixture of a metallic hydroxide and alcoholates having at least 8 carbon atoms in the alcohol radical and removing non-metallic hydrolysis products to form a grease containing 5–15% by weight based on said grease of metallic hydroxide as the essential gelling agent, said grease containing from 1 to 3 alcohol radicals having at least 8 carbon atoms for every ten hydroxyl groups present.

12. A process according to claim 6 wherein the lubricating oil is a mineral lubricating oil.

13. A process according to claim 8 wherein the lubricating oil is a mineral lubricating oil.

14. A grease composition comprising a lubricating oil gelled by the presence of from 1–40% by weight of said grease of calcium hydroxide, said grease having been prepared by the process according to claim 4.

FRED H. STROSS.
STANLEY T. ABRAMS.
ROBERT J. MOORE.

REFERENCES CITED

The following references are of record in the file of this patent:

UNITED STATES PATENTS

| Number | Name | Date |
| --- | --- | --- |
| 2,046,209 | Ray | June 30, 1936 |
| 2,225,197 | Stagner | Dec. 17, 1940 |
| 2,260,625 | Kistler | Oct. 28, 1941 |
| 2,469,041 | Jones | May 3, 1949 |